US006850286B2

(12) United States Patent
Burghard

(10) Patent No.: US 6,850,286 B2
(45) Date of Patent: Feb. 1, 2005

(54) CONTROL DEVICE FOR AUTOMATICALLY STORING INFORMATION FROM MEMORY OF ONE RECEIVING DEVICE INTO MEMORY OF ANOTHER RECEIVING DEVICE

(75) Inventor: Berndt Burghard, Guntramsdorf (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 09/741,922

(22) Filed: Dec. 20, 2000

(65) Prior Publication Data

US 2001/0013905 A1 Aug. 16, 2001

(30) Foreign Application Priority Data

Dec. 23, 1999 (EP) ............................................. 99890403

(51) Int. Cl.⁷ ........................... H04N 7/00; H04N 11/00; H04N 5/44
(52) U.S. Cl. ......................... 348/732; 348/460; 348/553; 348/567; 348/734
(58) Field of Search ................................ 348/460, 553, 348/567, 568, 569, 570, 731, 732, 734; 386/46; H04N 7/00, 11/00, 5/44

(56) References Cited

U.S. PATENT DOCUMENTS

| | | | | |
|---|---|---|---|---|
| 5,420,573 A | * | 5/1995 | Tanaka et al. | 340/825.24 |
| 5,546,193 A | * | 8/1996 | Hailey et al. | 386/83 |
| 5,575,000 A | * | 11/1996 | Park et al. | 455/186.2 |
| 5,687,273 A | * | 11/1997 | Huh | 386/46 |
| 5,808,702 A | * | 9/1998 | Yoshinobu et al. | 348/731 |
| 5,877,822 A | * | 3/1999 | Tazine et al. | 348/731 |
| 5,909,183 A | * | 6/1999 | Borgstahl et al. | 340/825.22 |
| 5,917,481 A | * | 6/1999 | Rzeszewski et al. | 345/721 |
| 5,943,605 A | * | 8/1999 | Koepele, Jr. | 725/114 |
| 5,956,097 A | | 9/1999 | Nguyen et al. | |
| 6,057,874 A | * | 5/2000 | Michaud | 725/141 |
| 6,072,983 A | * | 6/2000 | Klosterman | 725/49 |
| 6,122,011 A | * | 9/2000 | Dias et al. | 348/569 |
| 6,252,634 B1 | * | 6/2001 | Yuen et al. | 348/731 |
| 6,359,580 B1 | * | 3/2002 | Morrison | 348/731 |
| 6,392,716 B1 | * | 5/2002 | Nagata et al. | 348/731 |
| 6,469,634 B1 | * | 10/2002 | Williams et al. | 340/825.72 |
| 6,486,925 B1 | * | 11/2002 | Ko | 348/731 |
| 6,507,951 B1 | * | 1/2003 | Wugofski | 725/59 |
| 6,522,283 B1 | * | 2/2003 | Shiga et al. | 341/176 |
| 6,593,937 B2 | * | 7/2003 | Ludtke et al. | 345/629 |
| 6,675,388 B1 | * | 1/2004 | Beckmann et al. | 725/136 |
| 6,721,018 B1 | * | 4/2004 | Shintani et al. | 348/731 |

FOREIGN PATENT DOCUMENTS

EP 0607810 A1 1/1994

* cited by examiner

*Primary Examiner*—Michael H. Lee
*Assistant Examiner*—Brian P. Yenke

(57) ABSTRACT

A control device (32; 35) for controlling at least a first receiving device (1) so as to achieve that television channel information (FKI) stored in correlation with program position information (PPI) is stored in a second receiving device (2; 33), includes an encoding stage (29; 38) for encoding program position information (PPI) applied to the encoding stage (29; 38) and for supplying a corresponding control signal (SS1, SS2), and a transmitting stage (30) for transmitting the control signal (SS1, SS2) to the first receiving device (1) so as to achieve that a television signal (FS1) is supplied from the first receiving device (1) to the second receiving device (2; 33), the television signal (FS1) being identified by television channel information (FKI) stored in the first receiving device (1) in correlation with this program position information (PPI), expiry control means (31; 41) being provided, which are adapted to supply further program position information (PPI) in an ascending or descending order after the supply of said program position information (PPI) to the encoding stage (29; 38), the subsequent supply of program position information (PPI) to the encoding stage (29; 38) being not later than the expiry of a search time interval.

8 Claims, 2 Drawing Sheets

CONTROL DEVICE FOR AUTOMATICALLY STORING INFORMATION FROM MEMORY OF ONE RECEIVING DEVICE INTO MEMORY OF ANOTHER RECEIVING DEVICE

BACKGROUND AND SUMMARY

The invention relates to a control device as defined in the opening part of claim 1, for controlling at least a first receiving device, to a remote control as defined in the opening part of claim 7, and to a second receiving device as defined in the opening part of claim 8.

Such a control device, such a remote control and such a second receiving device are known from the document U.S. Pat. No. 5,956,097. The known control device has been included both in a first remote control, by means of which a television set can be controlled, and in a second remote control, by means of which a video recorder can be controlled. The television set now forms a first receiving device and the video recorder forms a second receiving device for receiving television signals.

The television set and the video recorder have memory means which each store program position information and associated television channel information. Television channel information includes the receiving frequency or the receiving channel of a television station, such as for example CNN. The television set and the video recorder each have a tuner to which television channel information can be applied and which can supply the television signal identified by the television channel information.

The known remote controls each have a keypad by means of which a user can enter control information, for example program position information. Encoding stages encode entered program position information for the video recorder in accordance with a first encoding method or for the television set in accordance with a second encoding method and supply corresponding control signals to transmitting means of the remote controls. The transmitting means transmit these control signals and set the tuner of the video recorder or the tuner of the television set to a program position identified by the program position information, so as to supply the television signal which is identified by the television channel information which is stored in the memory means in correlation with the received program position information.

The video recorder has comparison means to which the television signal from the tuner of the video recorder and, via a so-called SCART connector, the television signal from the tuner of the television set are applied. The comparison means compare the phases of the sync signals of the applied television signals and supply end of search information when the sync signals are in phase and, consequently, the television signals correspond.

To facilitate the use of the video recorder and the television set it is advantageous, when similar information is stored in the memory means for each of the two receiving apparatuses and both the television set and the video recorder receive the same television station, if the user has set the same program position. To copy the information stored in the memory means of the television set the user can set the television set, by means of the remote control of the television set, to the first program position, upon which the television signal of the television station identified by the television channel information stored in the memory means of the television set, in correlation with the first program position information, is supplied to the video recorder via the SCART connector.

Subsequently, the user can apply control information to the video recorder by means of the remote control of the video recorder in order to activate a search mode of the video recorder. When the video recorder is in the search mode the comparison means compare the television signals supplied to them and, by the application of search information to the tuner, control the tuner of the video recorder so as to supply another television signal until the comparison means detect correspondence and end-of-search information is supplied.

Upon the occurrence of end-of-search information the last television channel information supplied to the tuner is stored in the memory means of the video recorder together with the current program position of the video recorder. To copy all the television channel information stored in correlation with the program position information in the memory means of the television set the process described above must be repeated for each program position of the television set.

It has been found that the known control device, the known remote control and the known receiving device have the drawback that, in order to copy all the information stored in the memory means of the first receiving device, the user should actuate a multitude of keys of the two remote controls in the correct sequence. For each program position stored in the first receiving device a user should the actuate at least two keys, in which case for a currently normal number of approximately 30 program positions at least 60 keys on two remote controls should be activated in the correct sequence.

It is an object of the invention to provide a control device, a remote control and an receiving device as defined in the opening paragraph, in which a single activation by the user enables all the information stored in the memory means of the first receiving device to be stored automatically in the memory means of the second receiving device without a separate data link between the receiving devices being required. This object is achieved by the provision of sequence control means as defined in the characterizing part of claim 1 in a control device as defined in the opening part of claim 1 and in a remote control as defined in the opening part of claim 7, and by the provision of sequence control means as defined in the characterizing part of claim 2 in a receiving device as defined in the opening part of claim 8.

This has the advantage that the control device included in, for example, a remote control, controls the first receiving device and, if applicable, also the second receiving device upon a single actuation of a key of the remote control, in such manner that all the program position information and television channel information stored in the memory means of the first receiving device is stored fully automatically in the memory means of the second receiving device without any further intervention by the user.

On the one hand, the remote control can activate a search mode of the second receiving device by the one-time supply of a control signal to the second receiving device, in which mode the comparison means of the second receiving device, each time that the first receiving device receives a further television signal, automatically performs the comparison until this television signal is found and the corresponding television channel information is stored. On the other hand, the remote control can reactivate the comparison of the comparison means for each program position by the application of a control signal to the second receiving device upon expiry of each search time interval.

In accordance with the measures defines in claim 2 a part of the control device may be included in the second receiving device, which has the advantage that only the first receiving device has to be controlled via the transmitting means. This results in a particularly reliable control of the second receiving device.

The measures defined in claim 3 have the advantage that during copying of the information from the memory means of the first receiving device it is not necessary to await the search time interval for each program position but the next program position of the first receiving device can be set and the comparison by the comparison means can be started already after the occurrence of the end-of-search information.

The measures defined in claim 4 have the advantage that the first and the second receiving device may come from different manufacturers who usually employ different decoding methods for the decoding of received control signals.

The measures defined in claim 5 have the advantage that the control device automatically transmits program position information to the first receiving device as control signals encoded in accordance with different encoding methods and, consequently, the user need not carry out any adjustments relating to the manufacturer of the first receiving device.

A transmission of control signals by means of an infrared signal in accordance with claim 6 has proved to be particularly advantageous.

BRIEF DESCRIPTION OF THE DRAWINGS

The invention will now be described in more detail with reference to the drawing, which shows two embodiments given by way of example but to which the invention is not limited.

DETAILED DESCRIPTION

Figure 1:
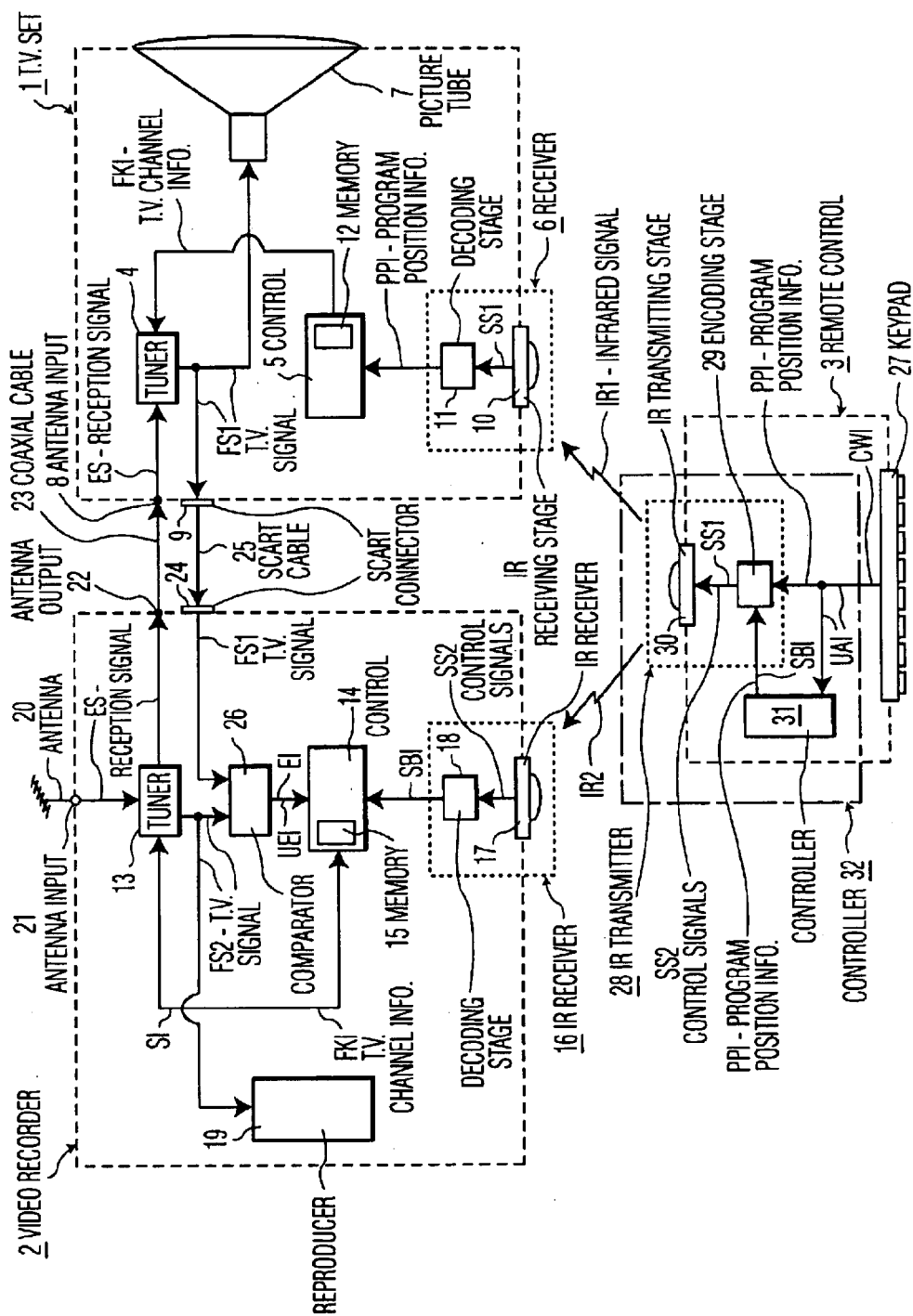
FIG. 1 shows a television set and a video recorder, which form receiving devices for receiving television signals, and a remote control including a control device for controlling the receiving devices.

FIG. 1 shows a television set 1, which forms a first receiving device, a video recorder 2, which forms a second receiving device, and a remote control 3, by means of which the television set 1 and the video recorder 2 can be controlled. The television set 1 includes a first tuner 4, first control means 5, first IR receiving means 6 and a picture tube 7.

The television set 1 has an antenna input 9 to which a reception signal ES can be applied, which reception signal includes at least two television signals FS from at least two television stations at different receiving frequencies. The reception signal ES can be applied from the antenna input 8 to the first tuner 4. The first tuner 4 can further receive television channel information FKI, which identifies a television signal FS included in the reception signal ES by the receiving frequency of the television signal FS. The first tuner 4 is adapted to supply the television signal FS1 identified by the television channel information FKI to the picture tube 7 and to a first SCART connector 9 of the television set 1.

The first IR receiving means 6 include a first IR receiving stage 10 and a first decoding stage 11. A first infrared signal IR1 from the remote control 3 can be received by the first IR receiving means 6. A first infrared signal IR received by the first IR1 infrared receiving stage 10 can be supplied to the first decoding stage 11 as a first control signal SS1.

The first decoding stage 11 is adapted to decode the applied first control signal SS1 in accordance with a first decoding method. It is to be noted here that there is no uniform decoding method for such control signals transmitted as an infrared signal by a remote control and that many manufacturers of television sets, video recorders or satellite receivers use different decoding methods. The first decoding stage 11 is adapted to supply the decoded first control signal SS1 to the first control means 5 as control information. Such control information may, for example, be formed by program position information PPI or by mode information for the activation of a mode of operation of the television set 1.

The first control means 5 include first memory means 12 adapted to store program position information PPI and to store television channel information FKI. Thus, the information stored in the first memory means 12 defines at which program position of the television set 1, which position is identified by the stored program position information PPI, which television signal FS is received from a television station by the first receiving means 4 and is supplied as the first television signal FS1, which television signal is identified by the associated stored television channel information FKI.

When a user wishes, for example, to receive the television signal from the television station "CNN", associated with the third program position of the television set 1, by means of the television set 1 and to display this signal as a television program by means of the picture tube 7, he transmits a first infrared signal IR1 containing the program position information PPI="3" to the television set 1 by means of the remote control 3. The first infrared signal IR1 received by means of the first IR receiving stage 10 is applied to the first decoding stage 11 and is decoded by this stage. Subsequently, the program position information PPI= "03" is applied to the first control means 5, which supplies the receiving frequency of the television signal of the television station "CNN", which is stored in the first memory means 12 as television channel information FKI in correlation with this program position information PPI= "03", to the first tuner 4. Finally, the television signal FS from the television station "CNN" in the reception signal ES, which television signal can be received at this receiving frequency, is supplied as the first television signal FS1 to the picture tube 7 and the first SCART connector 9.

The video recorder 2 includes a second tuner 13, a second control means 14 having second memory means 15, and second IR receiving means 16 having a second IR receiving stage 17 and a second decoding stage 18. The operation of said stages and means corresponds to the operation of the stages and means described with reference to the television set 1, the second decoding stage 18 decodes second control signals SS2 applied to it in accordance with a second decoding method.

The video recorder 2 further includes recording and reproducing means 19 which are adapted to record a second television signal FS2 supplied to the recording and reproducing means 19 by the second tuner in order to be recorded on a magnetic tape, and to reproduce a corresponding television signal FS from the magnetic tape. An antenna 20 is connected to an antenna input 21 of the video recorder 2. The reception signal ES can be received by means of the antenna 20 and can be applied to the second tuner 13 via the antenna input 21. From the second tuner 13 the reception signal ES can be applied to an antenna output 22, which is connected to the antenna input 8 of the television set 1 via a coaxial cable 23.

The video recorder 2 further has a second SCART connector 24, which is connected to the first SCART connector 9 of the television set 1 via a SCART cable 25. The first television signal FS1 applied from the first tuner 4 to the first SCART connector 9 can be supplied to the second SCART connector 24 via the SCART cable 25.

The video recorder 2 further includes comparison means 26 adapted to compare the first television signal FS1 applied to the comparison means 26 from the second SCART connector for comparison with second television signal FS2 applied to the comparison means 26 by the second tuner 13. For this purpose, the comparison means 26 compare at least certain components of the television signals FS1 and FS2 applied to these means with one another, for example as described in the document U.S. Pat. No. 5,956,097, whose subject matter is incorporated in the present document by reference.

The comparison means 26 are adapted to supply equality information EI as the result of the comparison of the television signals FS1 and FS2 when the first television signal FS1 and the second television signal FS2 correspond. Furthermore, the comparison means 26 are adapted to supply inequality information EI as the result of the comparison of the television signals FS1 and FS2 when the first television signal FS1 and the second television signal FS2 do not correspond. The equality information EI then forms end-of-search information and the inequality information UEI then corresponds to the absence of end-of-search information.

The remote control 3 can supply a second infrared signal IR2 to the video recorder in order to activate a search mode in the video recorder 2. The second infrared signal IR2 received by the second IR receiving means 16 is then applied to the second control means 14 as search mode information SBI. When the video recorder 2 is in the search mode the second control means 15 are adapted to carry out a comparison process, which process is described hereinafter and in which the receiving frequency of the second tuner 13 is changed until the second television signal FS2 corresponds to the first television signal FS1 supplied by the first tuner 4.

The equality information EI or the inequality information UEI is applied from the comparison means 26 to the second control means 14. The second control means 14 supply search information SI to the second tuner 13 when inequality information UEI is received. When the search information SI is received the second tuner 13 is adapted to change the receiving frequency until the second tuner 13 again supplies a second television signal FS2. Subsequently, the comparison means 26 again compare the television signals FS1 and FS2 applied to the comparison means 26 and apply the equality information EI or the inequality information UEI to the second control means 14.

During the execution of the comparison process the second control means 14 now supply search information SI to the second tuner 13 either until equality information EI is received from the comparison means 26 or until a search time interval after the activation of the search mode in the video recorder 2 has elapsed. Typically, a search time interval has a length as is required at the most by the second tuner 13, the comparison means 26 and the second control means 14 to set all the receiving frequencies that can be received with the second tuner 13 and to compare the second television signals FS2 supplied by the second tuner 13 by means of the comparison means 26. The search time interval can be, for example, 30 seconds or 60 seconds.

When during the execution of the comparison process the second control means 14 receive the equality information EI the second control means 14 are adapted to store the receiving frequency currently set by the second tuner 13 and applied to the second control means 14 as television channel information FKI in correlation with the program position information PPI which identifies the currently selected program position of the video recorder 2. To conclude the comparison process the second control means 14 deactivate the search mode.

The remote control 3 has a keypad 27 which forms entry means for the entry of control information by a user. Control information entered by the user can be supplied as a first infrared signal IR1 to control the television set 1 or as a second infrared signal IR2 to control the video recorder 2. For this purpose, the remote control 3 includes IR transmitting means 28, which include an encoding stage 29 and an IR transmitting stage 30.

The keypad 27 further enables code selection information CWI to be applied to the encoding stage 29 by means of which the encoding method can be selected by which the control information applied to the encoding stage 29 is encoded and is supplied as a control signal SS1 or SS2 to the IR transmitting stage 30. This has the advantage that the user can employ the remote control 3 both for controlling the television set 1 and for controlling the video recorder 2, even if these apparatuses have been manufactured by different manufacturers and the decoding stages 11 and 18 decode the received control signals SS1 and SS2 in accordance with different decoding methods.

The remote control 3 now includes expiry control means 31 which in combination with the IR transmitting means 28 provided in the remote control 3 form a control device 32. After each expiry of the search time interval defined in accordance with the above criteria the expiry control means 31 are adapted to supply control information and, particularly, to supply program position information PPI. Program position information PPI is supplied to the television set 1 as a first infrared signal IR1 in an ascending order as defined, for example, by the sequence PPI="01", PPI="02", . . . , PPI ="99". It is to be noted that the program position information PPI may likewise be supplied by the expiry control means 31 in a descending order as defined, for example, by the sequence PPI="99", PPI="98", . . . , PPI="01".

The advantages obtained as a result of the provision of the expiry control means will now be explained hereinafter with reference to an example of the use of the embodiment of the invention as shown in FIG. 1. In the example of use it is assumed that the user of the television set 1 and the remote control 3 has purchased a new video recorder 2 and wishes to copy the allocation of program positions to television stations as laid down in the television set 1 also in the new video recorder 2.

First of all, the user enters the code selection information CWI, which identifies the manufacturer of the video recorder 2, by means of the keypad 27, which defines the second encoding method for the encoding stage 29 for the transmission of second infrared signals IR2, which method corresponds to the second decoding method of the decoding stage 18.

Subsequently, the user actuates two keys of the keypad 27 at the same time in order to supply copy activation information UA1 to the expiry control means 31. Thereupon, the expiry control means 31 apply program position information PPI="01" to the encoding stage 29, which encodes this program position information PPI both in accordance with the first encoding method and in accordance with the second encoding method and supplies this information to the IR transmitting stage 30 as a first control signal SS1 an a second control signal SS2. Subsequently, the IR transmitting stage 30 supplies first and second infrared signals IR1 and IR2 corresponding to the control signals SS1 and SS2, upon which the first program position is assigned to the program position information PPI="01" both in the television set 1 and in the video recorder 2.

Subsequently, the expiry control means 31 supply the search mode information SBI to the video recorder 2 via the IR transmitting means 28 as a second infrared signal IR2, upon which the video recorder 2 is set to the search mode. As explained hereinbefore, the second control means 14 performs the comparison process when the video recorder 2 is in the search mode. As a result of the execution of the comparison process, the program position information PPI= "0" is stored in correlation with the television channel information FKI in the second memory means 15 at the latest upon expiry of the search time interval, which television channel information identifies the television signals FS1 and FS2 supplied by the first tuner 4 and the second tuner 13.

After expiry of the search time interval the expiry control means 31 now apply the next program position information PPI in the ascending sequence, i.e. the program position information PPI="02", to the television set 1 and the video recorder 2 via the IR transmitting means 28, upon which both the television set 1 and the video recorder 2 are set to the second program position. Subsequently, the expiry control means 31 again activate the search mode in the video recorder 2 by supplying the search mode information SBI to the video recorder 2 via the IR transmitting means 28. After completion of the comparison process by the second control means 14 the program position information PPI="02" stored in the second memory means 15 in correlation with the television channel information FKI is the same as in the memory means 12 of the television set 1. The control means 32 subsequently control the television set 1 and the video recorder 2 in the manner described hereinbefore until all the program position information PPI and television channel information FKI stored in the first memory means 12 is also stored in the second memory means 15 of the video recorder 2.

This has the advantage that by a single activation of the control means 32 of the remote control 3 a user can copy the allocation of program positions to television signals FS from television stations in the television set 1 to the video recorder 2. This copying of the information stored in the first memory means 12 into the second memory means 15 is effected fully automatically and without any further intervention by the user.

Moreover, the advantage is obtained that no additional cable for establishing a data link between the television set 1 and the video recorder 2 is required in order to load the information stored in the first memory means 12 into the second memory means 15. Such a data link is, for example, also known as a "Project 50" data link.

It is to be noted that the search mode of the video recorder 2 need not always be activated by the remote control 3 but may also be activated by the comparison means 26. In such a case the comparison means 26 are adapted to detect a change of the television signal FS received as the first television signal FS1 and, upon detection of such a change, to activate the search mode in the video recorder 2.

Figure 2:
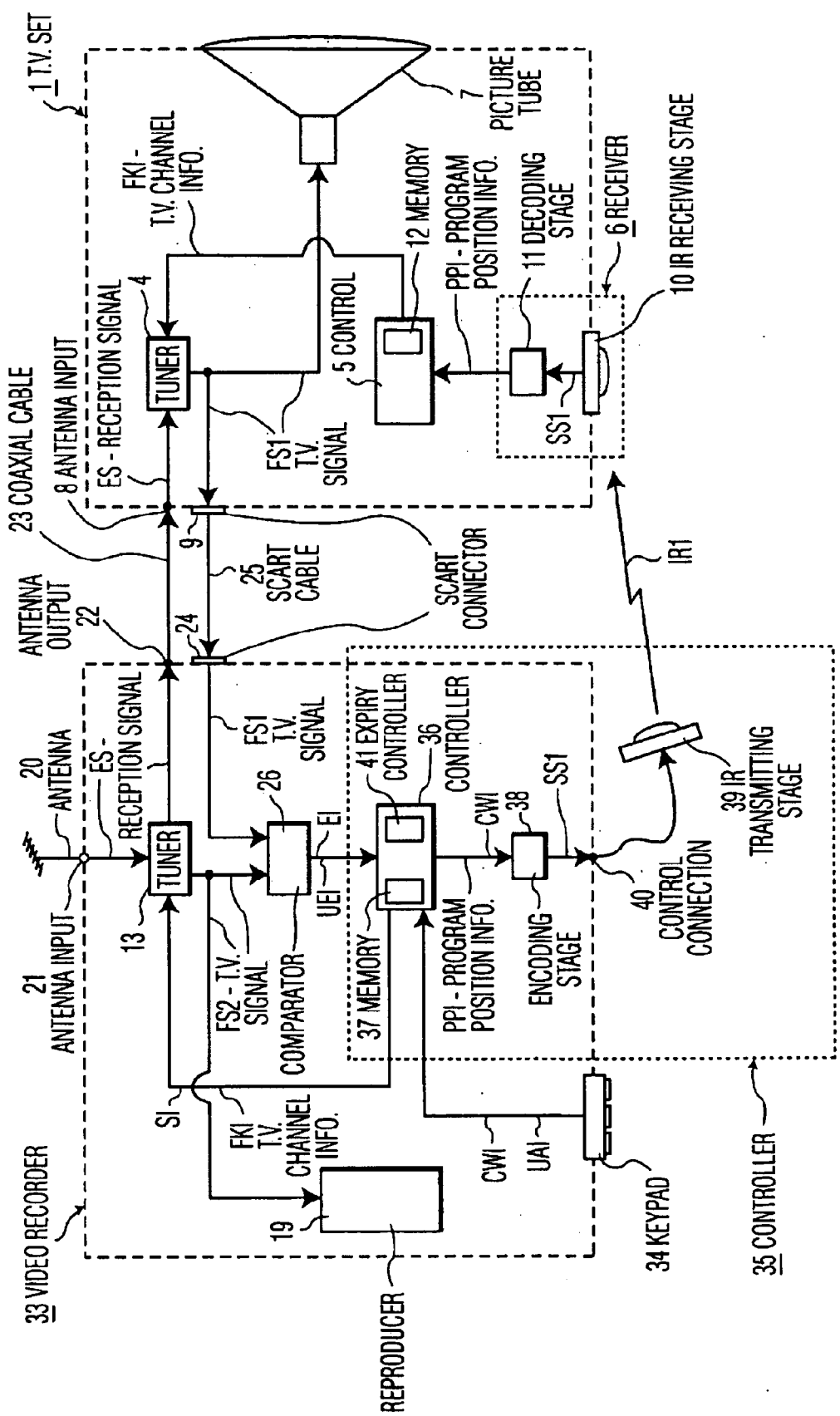
FIG. 2 shows a television set and a video recorder, which form receiving devices for receiving television signals, a part of a control device for controlling the television set being included in the video recorder.

FIG. 2 shows the television set 1 and a video recorder 33 in a second embodiment of the invention. The video recorder 33 differs from the video recorder 2 shown in FIG. 1 in that a keypad 34 and a control device 35 have been provided. By actuating keys of the keypad 34 a user can enter control information, for example the code selection information CWI or the copy activation information UAI.

The control device 35 has third control means 36 including third memory means 37, an encoding stage 38 and an IR transmitting stage 39. The third control means 36, like the second control means 14 in the first embodiment, are adapted to carry out the comparison process when the video recorder 33 is in the search mode. The third control means 36 can supply the program position information PPI and the code selection information CWI to the encoding stage 38.

Entering the code selection information CWI by means of the keypad 34 enables the user to define the encoding method of the encoding stage for the supply of the first control signal SS1, which corresponds to the decoding method of the first decoding stage 11 for decoding the first control signal SS1 in the television set 1. This has the advantage that the control device 35, which is partly accommodated in the video recorder 33, is adapted to control television sets and other products in the field of consumer electronics from a multitude of different manufacturers.

The IR transmitting stage 39 of the control means 35 can be connected to a control connection 40 of the video recorder 33. This has the advantage that second control means 14 already provided in a video recorder such as the video recorder 2 can be used as third control means 36 in the control device 35 and the IR transmitting stage 39 can or should be connected to the video recorder 33 only when the information stored in the first memory means 11 of the television set 1 is to be copied into the second memory means 37 of the video recorder 33. Advantageously, the control device 35 can also be used for controlling another consumer electronics product, such as for example a satellite receiver.

The third control means 36 now also include expiry control means 41 which are adapted to control the television set 1 and which each time supply the program position information PPI of a further program position in an ascending order to the television set 1 as a first infrared signal IR1 at the latest after expiry of the search time interval.

The advantages of the control device 35 will be further explained with reference to an example of the use of the embodiment of the invention as shown in FIG. 2. In the example of use it is assumed that the user of the television set 1 has re-assigned the television signals FS from the television stations to program positions of the television set 1 in order to assign television stations which are of particular interest to the user to program positions with program position information PPI having a low sequence number. In the example of use it is also assumed that the user also wishes to copy the allocation defined by information stored in the first memory means 11 to the video recorder 33.

For this purpose, the user actuates two keys of the keypad 34 of the video recorder 33 in order to supply the copy activation information UAI to the expiry control means 41. Subsequently, the expiry control means 41 set the television set 1 to the program position having the program position information PPI="01" by transmitting the program position information PPI="01" to the television set 1 via the encoding stage 38 and the IR transmitting stage 39. As a result of this, the television set 1 supplies the first television signal FS1 to the comparison means 26 via the SCART cable 25, which television signal is identified by the television channel information FKI stored in the first memory means 12 in correlation with the program position information PPI="0".

After the application of the program position information PPI the expiry control means 41 activate the search mode of the video recorder 33, upon which the second television signal FS2 received by the second tuner 13 is changed in the course of the comparison process until the comparison means 26 supply the equality information EI. Subsequently, the television channel information FKI which identifies the second television signal FS2 supplied by the second tuner 13 is stored, in combination with the program position information PPI="0", in the third memory means 37 and the search mode is terminated.

After having received the equality information EI, i.e. normally speaking already before expiry of the search time interval, the expiry control means 41 are adapted to supply the next program position information PPI="02" to the television set 1 and to activate the search mode in the video recorder 33. Subsequently, all the program positions are set in the television set 1 in the manner described hereinbefore in an ascending order and program position information PPI is stored in the third memory means 37 in correlation with television channel information FKI determined in the comparison process.

This has the advantage that copying all the information stored in the first memory means 12 substantially more rapidly than in the case that the search time interval has to be awaited for each program position. Moreover, by the provision of a part of the control device 35 in the video recorder 33 the advantage is obtained that the transmission of the second control signal SS2 from the control means 35 to the video recorder 33 as a second infrared signal IR2 is not necessary, as a result of which the operation of copying the information stored in the first memory means 12 is particularly reliable.

It is to be noted that there are various possibilities of activating a search mode in the second receiving device in order to copy and store program position information PPI and television channel information FKI stored in memory means of the first receiving device in memory means of the second receiving device. However, all these possibilities have in common that program position information PPI can be supplied to the first and, if required, also to the second receiving device, time-controlled or event-controlled by the control device, as is claimed in claim 1 and claim 3.

It is to be noted that various possibilities of comparing television signals FS in comparison means are known to those skilled in the art and are assumed to be part of the subject matter disclosed in the present document.

It is to be noted that it is particularly advantageous when it is not necessary for the user to define, by the entry of code selection information VWI, the encoding method by means of which the encoding stage encodes the control information applied to it. In order to obtain this advantage the encoding stage is adapted to encode any control information applied to it by encoding methods which can be carried out by means of the encoding stage, the control signals SS being successively transmitted to the receiving devices as infrared signals by the IR transmitting stage. The decoding stage of the receiving device is then adapted to decode one of these control signals SS.

It is to be noted that for copying the allocation of the program positions of the first receiving device to television signals FS the control device 32 of the remote control 3 may alternatively supply the program position information FPI to the first and the second receiving device in an arbitrary sequence provided that each time the same program position information PPI is supplied to both receiving devices.

What is claimed is:

1. A control device for controlling at least a first receiving device so as to achieve that television channel information stored in correlation with program position information is stored in a second receiving device, the control device having:

an encoding stage for encoding program position information applied to the encoding stage and for supplying a corresponding control signal, and a transmitting stage for transmitting the control signal to the first receiving device so as to achieve that a television signal is supplied from the first receiving device to the second receiving device, the television signal being identified by television channel information stored in the first receiving device in correlation with this program position information, and expiry control means adapted to supply further program position information after the supply of said program position information to the encoding stage before the expiry of a search time interval.

2. A control device as claimed in claim 1, wherein the second receiving device includes at least a part of the control device.

3. A control device as claimed in claim 2, wherein end-of-search information can be applied to the expiry control means by comparison means in the second receiving device for the comparison of television signals, and when end-of-search information occurs the expiry control means are adapted to supply further program position information before expiry of the search time interval.

4. A control device as claimed in claim 2, further including a second receiving device for receiving television signals, said second receiving device having memory means for the storage of program position information and television channel information stored in a correlated fashion, and having receiving means to which the receiving signal which contains at least two television signals can be supplied and which are adapted to supply the television signal identified by television channel information, and having comparison means for the comparison of at least a component of the television signal supplied by the receiving means with at least a component of a television signal supplied to the second receiving device by the first receiving device and to supply end-of-search information in the case of correspondence of the compared components of the television signals, in which search information can be applied to the receiving means in the absence of end-of-search information and in which the television channel information which identifies the television signal supplied by the receiving means can be stored in the memory means when the end-of-search occurs.

5. A control device as claimed in claim 1, wherein code selection information can be applied to the encoding stage, and wherein the encoding stage is adapted to encode program position information in accordance with different encoding methods depending on the applied code selection information.

6. A control device as claimed in claim 1, wherein the encoding stage is adapted to encode program position information applied to the encoding stage in accordance with at least two different encoding methods, and wherein the encoding device is adapted to supply program position information applied to the encoding stage to the transmitting stage as at least two successive control signals, which control signals contain the program position information encoded in accordance with the at least two different encoding methods.

7. A control device as claimed in claim 1, wherein the transmitting stage is adapted to transmit the control signal as an infrared signal.

8. A control device as claimed in claim 1, further including a remote control for controlling at least the first receiving device, said remote control having entry means for the entry of program position information.

* * * * *